US006865636B1

United States Patent
Hober et al.

(10) Patent No.: US 6,865,636 B1
(45) Date of Patent: Mar. 8, 2005

(54) MULTITASKING PROCESSOR SYSTEM FOR MONITORING INTERRUPT EVENTS

(75) Inventors: Peter Hober, Riemerling (DE); Christian Jenkner, Velden (DE); Xiaoning Nie, München (DE)

(73) Assignee: Infineon Technologies AG, München (DE)

( * ) Notice: Subject to any disclaimer, the term of this patent is extended or adjusted under 35 U.S.C. 154(b) by 217 days.

(21) Appl. No.: 10/130,327

(22) PCT Filed: Nov. 10, 2000

(86) PCT No.: PCT/EP00/11164

§ 371 (c)(1),
(2), (4) Date: Aug. 6, 2002

(87) PCT Pub. No.: WO01/38968

PCT Pub. Date: May 31, 2001

(30) Foreign Application Priority Data

Nov. 19, 1999 (DE) ......................... 199 55 776

(51) Int. Cl.[7] .............................................. G06F 13/00
(52) U.S. Cl. ........................................ 710/260; 710/48
(58) Field of Search ............................... 710/260–268, 710/48–50; 713/10–15, 26–30

(56) References Cited

U.S. PATENT DOCUMENTS

| 4,975,836 | A |   | 12/1990 | Hirosawa et al. |         |
|-----------|---|---|---------|-----------------|---------|
| 5,317,747 | A | * | 5/1994  | Mochida et al.  | 710/260 |
| 5,495,615 | A | * | 2/1996  | Nizar et al.    | 710/260 |
| 5,845,131 | A | * | 12/1998 | Kim             | 710/260 |
| 5,944,816 | A |   | 8/1999  | Dutton et al.   |         |

FOREIGN PATENT DOCUMENTS

| DE | 43 01 117 A1  | 5/1993 |
|----|---------------|--------|
| WO | WO 99/21083 A1| 4/1999 |

* cited by examiner

*Primary Examiner*—Christopher Shin
(74) *Attorney, Agent, or Firm*—Jenkins, Wilson & Taylor, P.A.

(57) ABSTRACT

In a processor system, different memory means (8), which can in each case comprise a memory stack (9) for the instruction counter, a register (10) for temporarily storing data and status register (11), are provided for various tasks. When an interrupt event (EV) occurs which causes a change from a current task to a new task, a controller (21) switches from the memory means (8) allocated to the old task to the memory means (8) allocated to the new task.

8 Claims, 3 Drawing Sheets

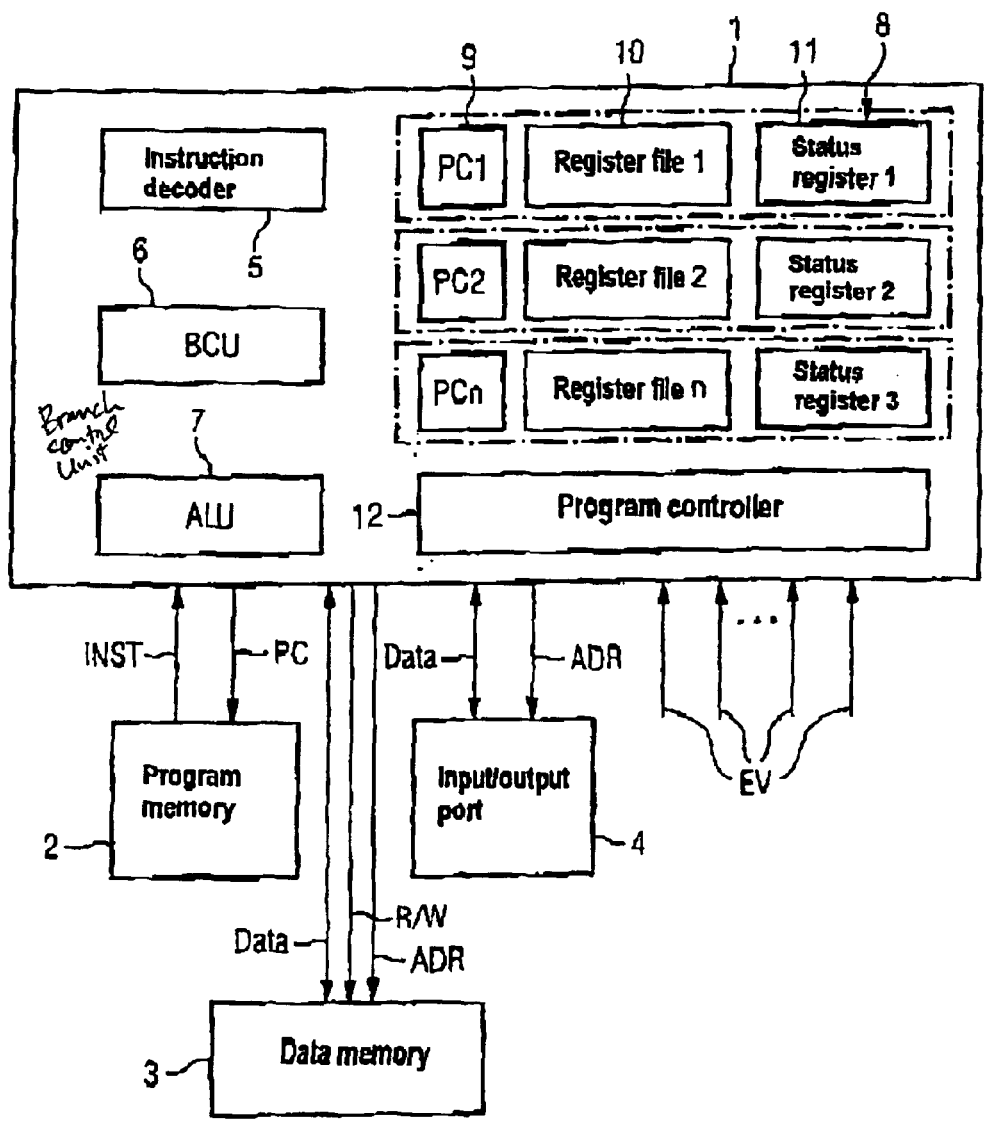

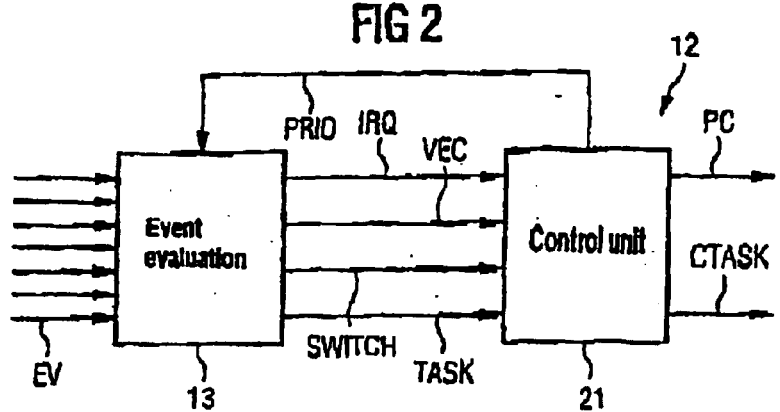
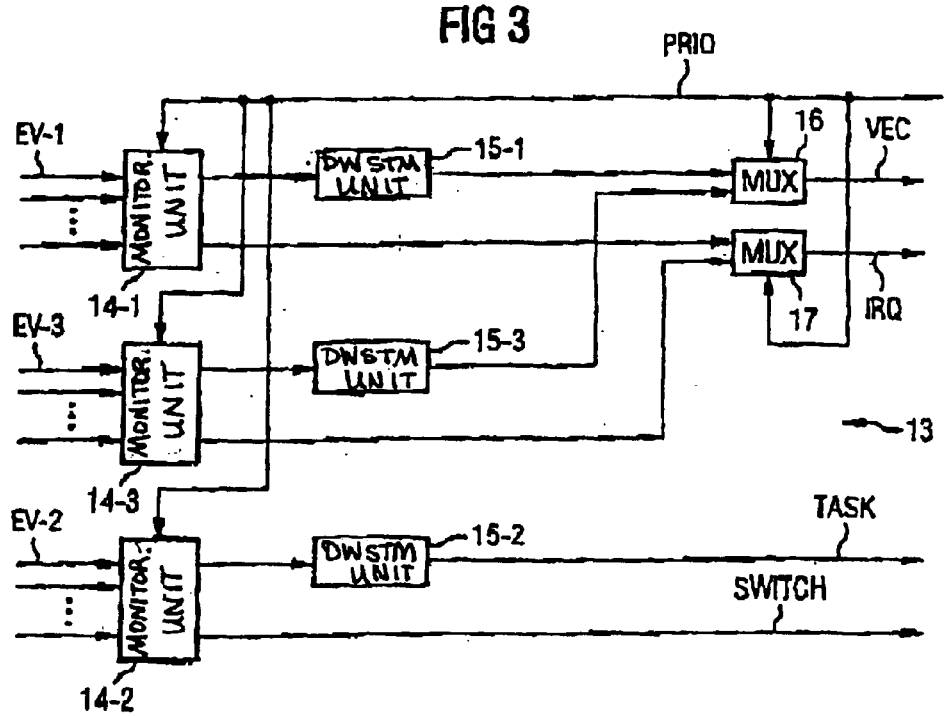

MULTITASKING PROCESSOR SYSTEM FOR MONITORING INTERRUPT EVENTS

DESCRIPTION

1. Technical Field

The present invention relates to a processor system according to the precharecterizing clause of claim 1, which is pro interrupts.

2. Background Art

Telecommunication terminals such as, for example, modems or so-called line cards must be able to respond to particular software or hardware events. If a processor system is used for control purposes in such telecommunication terminals, interrupt processing is usually provided in the processor system so that it can respond to the events described above.

For the interrupt processing, the individual events which can trigger an interrupt in the processor system are monitored. As soon as the occurrence of an interrupt event has been detected, a corresponding interrupt request signal is generated and transmitted to a processor unit of the processor system which thereupon determines the start address of the corresponding interrupt routine which is supposed to run for executing the interrupt in the processor system. If a number of interrupt events occur at the same time, only one particular interrupt event of these interrupt events is selected in accordance with a predetermined scheme for executing the corresponding interrupt. The value of the program counter (PC) of the task running before the interrupt in the processor system is saved in a memory stack so that the interrupt routine can be subsequently executed. After the interrupt routine has ended, the original task can be continued again by accessing the saved program counter.

Before the interrupt routine is performed, it is generally not only the instantaneous value of tire program counter but also other information on the status of the processor system and, respectively, of the task running on it which have to be saved before the interrupt event occurs. This status information can relate, in particular, to the contents of registers or zero and carry flags etc. In known processor systems, therefore, so-called shadow registers are used for accelerating the interrupt processing which represent additional registers which only make an appearance in the case of an interrupt for saving the above status information and are not used otherwise (compare, e.g. "ARM System Architecture", Steve Furber, Addison-Wesley, 1996). This makes it possible to avoid having to use time-consuming register storage commands for saving the information described.

However, the abovementioned approach only represents an effective measure if it is intended to run only one task in the processor system. In so-called multitasking processor systems in which a number of tasks can run simultaneously or virtually simultaneously, this approach cannot be easily used since different program counters must be taken into consideration for the individual tasks in this case. In addition, the approach described above is relatively expensive due to the use of the additional shadow registers.

SUMMARY OF THE INVENTION

The present invention is, therefore, based on the object of proposing a processor system with interrupt processing in which a change of the task, caused by a corresponding interrupt, can be performed with less expenditure.

According to the invention, this object is achieved by a processor system having the features of claim 1. The subclaims define advantageous and preferred embodiments of the present invention.

According to the invention, different storage means are provided for different tasks and the storage means can comprise, in particular, a memory for the program counter of the respective task, registers for temporarily storing data during the execution of the respective task and status registers for storing status information such as, for example, carry or zero flags. If it is intended to switch from one task to another task on occurrence of a particular interrupt event, it is only necessary to switch to the storage means allocated to the new task for this purpose. The provision of separate hardware areas for different tasks thus provides for a hardware-supported multitasking operation of the processor system without having to perform a multiplicity of saving processes when switching to a new task.

The different interrupts are preferably processed under priority control, individual priorities being assigned both to the corresponding interrupt events and to the tasks running in the processor system. A particular priority level is preferably defined which can lead to a change of task. It is only events having this particular priority level which can cause a change of task. The consequence of any other events is only that a start address is generated for the corresponding interrupt routine.

The present invention is suitable, for example, for being used in telecommunication terminals such as, e.g. modems or line cards and applies, in particular, to xDSL terminals.

BRIEF DESCRIPTION OF THE DRAWINGS

In the text which follows, the invention will be explained by means of a preferred illustrative example and referring to the attached drawing, in which:

FIG. 1 shows a simplified block diagram of a processor system according to a preferred illustrative embodiment of the present invention, FIG. 2 shows a possible implementation of a program control unit shown in FIG. 1, FIG. 3 shows a possible implementation of an event evaluating unit shown in FIG. 2.

DETAILED DESCRIPTION OF THE INVENTION

Figure 4:
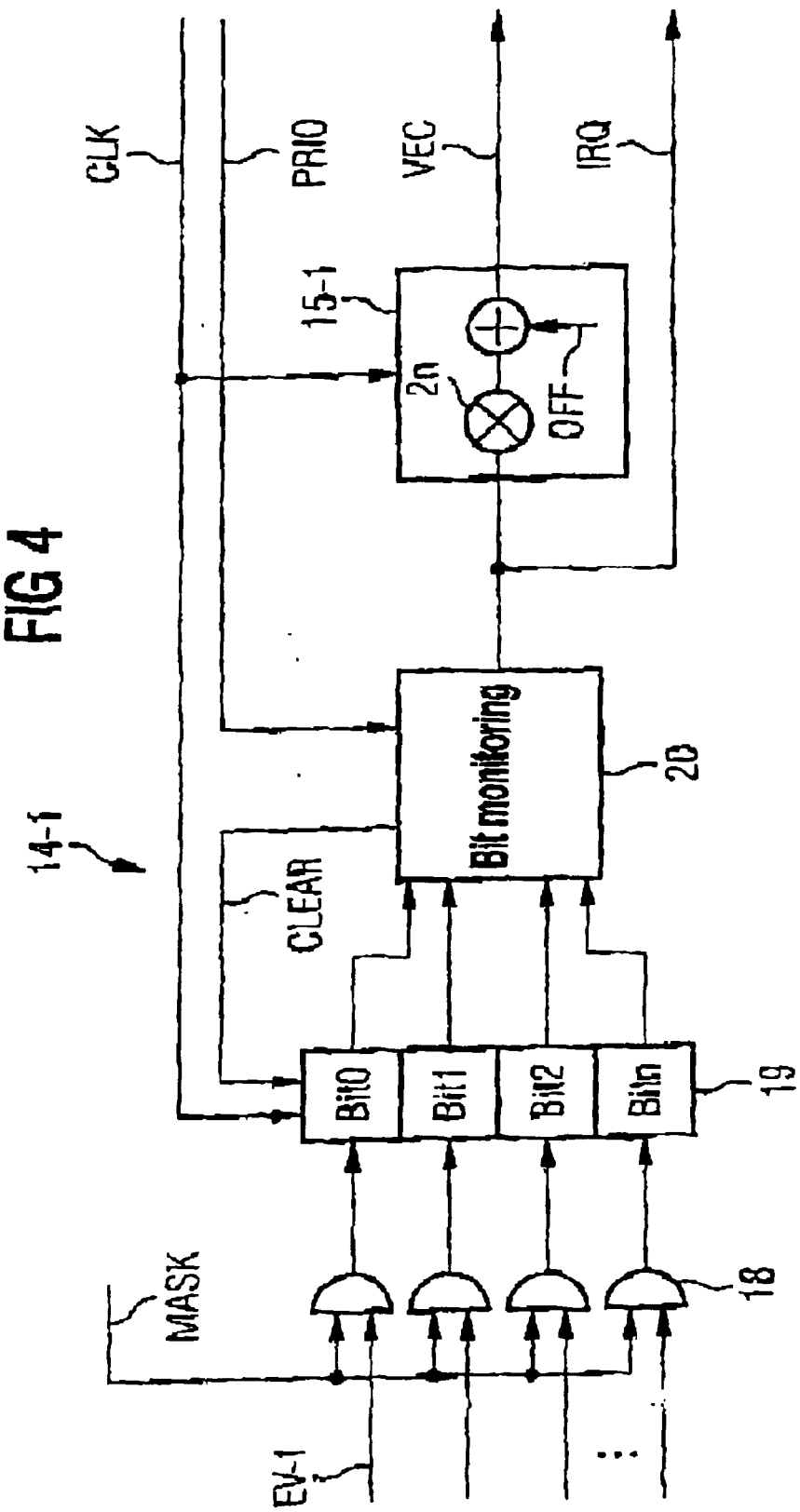
FIG. 4 shows a possible implementation of a monitoring unit shown in FIG. 3.

The processor system shown in FIG. 1 comprises a processor unit 1 which comprises, among other things, a program controller 12 and an instruction decoder 5, a so-called branch control unit (BCU) 6 and at least one arithmetic logic unit (ALU) 7. In addition, an individual or task-specific hardware environment 8 is provided for each task which can be executed on the processor system and which in each case comprises a memory stack 9, a register bank with one or more registers 10 and one or more status registers 11. In the memory stack 9, the instantaneous value of the program counter (PC) of the corresponding task is stored in each case. The registers 10 are used for temporarily storing data during the processing of the corresponding task. The status registers 11, on the other hand, are intended for storing status information or status flags such as, for example, zero or carry flags so that the content of the status registers in each case designates the current status of the corresponding task.

The program controller 12 monitors a number of interrupt events EV. When a particular interrupt event occurs, either a corresponding interrupt routine is started or a change of task is performed. The program controller 12 thus specifies the current task in each case and the instruction to be executed within this task, and thus the valve of the program counter of this task and outputs corresponding information.

Using this value of the program counter PC, output by the program controller 12, it is possible to access a program memory 2 and read out a corresponding instruction INST. This instruction INST is decoded by the instruction decoder 5 and supplied to the BCU 6 and the ALU 7 for execution and these two lastmentioned units also know the number of the task to be processed. Together with the instruction decoder 5, the BCU 6 ensures that the correct hardware environment 8, i.e. the hardware environment actually provided for the task to be processed, is always accessed. The BCU 6 is responsible for hardware switching between the memory stacks 9 which are provided for the individual program counters PC whereas the registers 10 and the status registers 11 are accessed both by means of hardware switching by the BCU 6 and in software by means of an internal instruction by the instruction decoder 5. The ALU 7, finally, executes the instruction INST by using the corresponding hardware environment 8, and it may be necessary to address a data memory 3 for this purpose in which an address signal ADR is stored and it is established with the aid of a control signal R/W whether the data DATA are to be read out of the data memory 3 or to be written into the data memory 3. Similarly, it may be necessary, as a consequence of the execution of the instruction, to address one or more input/output ports 4 to which an address signal ADR is to be applied in order to be able to read data DATA from an output port 4 or to write data DATA into an input port 4.

FIG. 2 shows a possible implementation of the program controller 12. An evaluating unit 13 monitors the occurrence of the individual interrupt events EV and generates in dependence on these an interrupt request signal IRQ with a start address VEC for the corresponding interrupt routine or a switching signal SWITCH for initiating a change of task with information TASK on the task to which it is intended to switch. A control unit 21 receives this information from the evaluating unit 13 and initiates in dependence thereon, as already described, the use of the correct hardware environment 8 in each case. For this purpose, the control unit 21 outputs, on the one hand, an information item CTASK on the task currently to be executed to the instruction decoder 5 and the BCU 6 and the program counter PC corresponding to this task CTASK for addressing the program memory z.

Interrupt processing takes place under priority control. For this purpose, an individual priority is assigned to each task and to each interrupt event EV. The priority PRIO of the current task is reported to the evaluating unit 13 by the control unit 21. In principle, a task can only be interrupted by an interrupt if the corresponding interrupt event has a higher priority than the task. Accordingly, the priority of a task must be decremented by the task itself or by another task if it is to be possible to interrupt the corresponding task also by interrupt events having a lower priority level. A task having the highest priority level can only be interrupted by interrupt events which also have the highest priority level. This can apply, for example, to a reset interrupt.

Within the various priority levels, a particular priority level is defined which exclusively leads to a change of task. i.e., it is only interrupt events having this priority level which can cause a change between the individual tasks so that the information SWITCH and TASK shown in FIG. 2 is only generated and supplied to the control unit 21 when these interrupt events occur. Any other interrupt events only lead to the interrupt request IRQ being output by the evaluating unit 13 with a vector VEC which contains the branch or start address for the interrupt routine to be executed. The control unit 21 is thus supplied either with the SWITCH and TASK signals or the IRQ and VEC signals. In the former case, a corresponding interrupt routine is called up whereas, in the latter case, a change of task takes place. The IRQ signal and the SWITCH signal cannot occur at the same time.

FIG. 3 shows a possible implementation of the evaluating unit 13 shown in FIG. 2 and it is assumed that three different priorities are defined and priority "2" is the priority provided exclusively for a change of task. For each group of interrupt events EV_1 ... EV_3 which have the same priority, a separate monitoring unit 14_1 ... 14_3 is provided which exclusively monitors the occurrence of the interrupt events assigned to it and the priority PRIO of the task currently processed.

As soon as the monitoring unit 14_1 or 14_3 has detected the occurrence of an interrupt event EV_1 or EV_3 allocated to it, an interrupt request signal IRQ is generated and a downstream unit 15_1 or 15_3, respectively, generates in dependence on the interrupt event which has occurred a corresponding vector VEC which designates the required start address for the interrupt routine to be executed. The signal thus generated are supplied to multiplexers 16 or 17, respectively, the multiplexers 16 and 17 being switched in dependence on the priority control signal PRIO and switching in dependence thereon only one of the two input signals through to their output and supplying it to the control unit 21 shown in FIG. 2.

The monitoring unit 14_2 is provided exclusively for monitoring the interrupt events EV_2 which have priority "2" and can thus cause a change of task by definition. As soon as the monitoring unit 14_2 has detected the occurrence of an interrupt event EV_2 allocated to it, the switching signal SWITCH is generated which instructs the control unit 21 to perform a change of task and a downstream unit 15_2 generates in dependence on the interrupt event which has occurred, in the form of the information item TASK, the number of the task to which it is intended to switch.

Within each monitoring unit 14_1 ... 14_3, subpriorities can be defined if the corresponding monitoring unit always scans its inputs with regard to the occurrence of the corresponding interrupt event in the same order, for example always from top to bottom.

FIG. 4 shows a possible implementation of the monitoring unit 14_1 shown in FIG. 3, and the downstream unit 15_1.

The monitoring unit 14_1 comprises an input memory 19 in which a corresponding bit is set when one of the interrupt events EV_1 occurs. A bit monitoring unit 20 monitors the individual bits of the input memory 19 in correspondence with a predetermined clock CLK. As soon as the bit monitoring unit 20 has detected a set bit in the input memory 19, the interrupt request signal IRQ is generated and, depending on the position of the bit set in the input memory 19, the vector VEC with the start or branch address for the required interrupt routine is generated. For this purpose, the position of the bit set in the input memory 19 is mapped to the corresponding start address by the unit 15_1, this being done, as shown in FIG. 4, by first performing a bit shift operation by n bits (corresponding to a multiplication via the factor $2^n$) and then an addition with a particular offset value OFF. After that, the bit set in the input memory 19 is cleared again with the aid of a clear signal CLEAR.

The bit monitoring unit 20 is also used for monitoring the priority PRIO of the current task. Generation of the interrupt request signal IRQ and of the vector VEC with the start address of the corresponding interrupt routine is only enabled by the bit monitoring unit 20 if the priority PRIO of the current task is less than the priority of the corresponding interrupt event.

FIG. 4 also shows the possibility that individual interrupt events can be masked, i.e. made invisible for the bit monitoring unit 20, with the aid of a masking circuit 18.

In the present example, this masking circuit 18 is designed in the form of AND gates which can be programmed with the aid of a corresponding signal MASK. Such an individually programmable masking circuit 18 is preferably used before each monitoring unit 14_1 . . . 14_3.

The monitoring unit 14_3 and the corresponding unit 15_3 can be configured identically to FIG. 4. Similarly, the monitoring unit 14_2 can be configured identically to FIG. 4. The configuration of the unit 15_2, on the other hand, differs from FIG. 4 in that the unit 15_2 does not map the position of a bit set in the corresponding input memory 19 to an address but to a task number.

What is claimed is:

1. A multitasking processor system comprising:
   a program controller which has an evaluating unit for monitoring an occurrence of interrupt events and a control unit which is provided for controlling an execution of an interrupt routine when the evaluating unit detects the occurrence of said interrupt events,
   said processor system further comprising different memory circuits which are provided for different tasks in the multitasking processor system,
   wherein the control unit is designed in such a manner that, on the occurrence of interrupt events which causes a change from a current task to a new task and which have a particular predetermined priority level, the control unit initiates, for executing the new task, a switchover from a memory circuit allocated to the current task to a memory circuit allocated to the new task,
   wherein the memory circuit exhibiting in each case one memory for a program counter of an associated task, at least one register for temporarily storing data which are produced during execution of the associated task, and at least one status register for storing status information of the associated task,
   wherein individual priorities are allocated to the individual interrupt events and at least one particular priority is provided for change to a new task, and
   wherein the evaluating unit, on detection of the occurrence of interrupt events having the particular predetermined priority forwards a corresponding request for a change from the current task to the corresponding new task to the control unit.

2. The processor system as claimed in claim 1,
   wherein individual priorities are allocated to the individual tasks which can be executed by the processor system,
   wherein said individual priorities are allocated to the individual interrupt events, and
   wherein the evaluating unit is designed in such a manner that, on detection of the occurrence of an interrupt event, the evaluating unit only forwards a corresponding request for execution of the corresponding interrupt to the control unit if the priority of the corresponding interrupt events is higher than the priority of the task currently executed in the processor system.

3. The processor system as claimed in claim 2, wherein the evaluating unit is designed in such a manner that, on detection of the occurrence of an interrupt event having the particular priority together with the request for the change from the current task to the corresponding new task, the evaluating unit also forwards an information item specifying the new task to the control unit.

4. The processor system as claimed in claim 2, wherein the evaluating unit is designed in such a manner that, when the occurrence of an interrupt event is detected, the evaluating unit only forwards a corresponding request for execution of the corresponding interrupt together with an address specifying a corresponding interrupt routine to the control unit if the priority of the corresponding interrupt events is higher than the priority of the task currently executed in the processor system and the priority of the interrupt events does not correspond to the particular priority.

5. The processor system as claimed in claim 1, wherein the evaluating unit comprises a separate monitoring device for each possible priority of the interrupt events, each monitoring device monitoring the occurrence of the interrupt events having the corresponding priority in each case.

6. The processor system as claimed in claim 5, wherein the evaluating unit comprises for each monitoring device a separate masking circuit which precedes this monitoring device.

7. The processor system as claimed in claim 1, wherein the evaluating unit is preceded by a programmable masking circuit which masks the occurrence of corresponding interrupt events for the evaluating unit in dependence on its programming.

8. The processor system as claimed in claim 1 wherein, the processor system is used in a telecommunication terminal, particularly in an xDSL telecommunication terminal.

* * * * *